US012001306B2

(12) United States Patent
Gandhi

(10) Patent No.: US 12,001,306 B2
(45) Date of Patent: Jun. 4, 2024

(54) CROSS-JURISDICTIONAL MICROSERVICE-BASED CLOUD PLATFORM DEPLOYMENT

(71) Applicant: Avanade Holdings LLC, Wilmington, DE (US)

(72) Inventor: Gnana Geetha Gandhi, Woodridge, IL (US)

(73) Assignee: Avanade Holdings LLC, Wilmington, DE (US)

( * ) Notice: Subject to any disclaimer, the term of this patent is extended or adjusted under 35 U.S.C. 154(b) by 730 days.

(21) Appl. No.: 16/855,153

(22) Filed: Apr. 22, 2020

(65) Prior Publication Data

US 2020/0341876 A1 Oct. 29, 2020

Related U.S. Application Data

(60) Provisional application No. 62/837,630, filed on Apr. 23, 2019.

(51) Int. Cl.
*G06F 15/173* (2006.01)
*G06F 11/30* (2006.01)
(Continued)

(52) U.S. Cl.
CPC ...... *G06F 11/3006* (2013.01); *H04L 63/0209* (2013.01); *H04L 67/1095* (2013.01); *H04L 67/34* (2013.01)

(58) Field of Classification Search
None
See application file for complete search history.

(56) References Cited

U.S. PATENT DOCUMENTS

| 10,349,338 B2 * | 7/2019 | Nagasaka | H04W 60/00 |
| 2005/0154904 A1 * | 7/2005 | Perepa | G06F 21/12 |
| | | | 713/193 |

(Continued)

FOREIGN PATENT DOCUMENTS

| EP | 1227639 A2 * | 7/2002 | H04L 29/06 |
| EP | 2017767 A1 * | 1/2009 | G06F 21/6245 |

(Continued)

OTHER PUBLICATIONS

N. Paladi, M. Aslam and C. Gehrmann, "Trusted Geolocation-Aware Data Placement in Infrastructure Clouds," 2014 IEEE 13th International Conference on Trust, Security and Privacy in Computing and Communications, 2014, pp. 352-360, doi: 10.1109/TrustCom.2014.47. (Year: 2014).*

*Primary Examiner* — Yves Dalencourt
(74) *Attorney, Agent, or Firm* — Harrity & Harrity, LLP

(57) ABSTRACT

An orchestrator device may receive a request from a first module deployed in a second cloud platform in a second jurisdiction, wherein the request is compliant with a jurisdictional characteristic of the second jurisdiction. The orchestrator device may process the request in order to identify a second module deployed in the first cloud platform to which to forward the request. The orchestrator device may forward the request to the second module to enable fulfillment of the request. The orchestrator device may receive a response from the second module, wherein the response is compliant with a jurisdictional characteristic of the first jurisdiction. The orchestrator device may process the response, to identify a third module deployed in the second cloud platform to which to forward the response. The orchestrator device may forward the response, to the third module.

20 Claims, 9 Drawing Sheets

(51) Int. Cl.
*H04L 9/40* (2022.01)
*H04L 67/00* (2022.01)
*H04L 67/1095* (2022.01)

(56) References Cited

U.S. PATENT DOCUMENTS

| | | | |
|---|---|---|---|
| 2010/0197324 A1* | 8/2010 | Bolin | H04W 4/02 |
| | | | 455/456.3 |
| 2014/0197783 A1* | 7/2014 | Kim | H02J 50/80 |
| | | | 320/108 |
| 2014/0215206 A1* | 7/2014 | Courtney | H04W 12/043 |
| | | | 713/156 |
| 2014/0286178 A1* | 9/2014 | Roy | H04W 52/18 |
| | | | 370/252 |
| 2014/0313954 A1* | 10/2014 | Choi | H04W 52/0261 |
| | | | 370/311 |
| 2014/0342670 A1* | 11/2014 | Kang | H04L 69/14 |
| | | | 455/67.11 |
| 2015/0215844 A1* | 7/2015 | Davis | H04W 8/183 |
| | | | 455/432.1 |
| 2016/0241328 A1* | 8/2016 | Kang | H04B 7/18539 |
| 2017/0318084 A1* | 11/2017 | Giffin | H04L 67/025 |

FOREIGN PATENT DOCUMENTS

| | | | | |
|---|---|---|---|---|
| EP | 2744251 A1 * | 6/2014 | | H04L 63/08 |
| WO | WO-2008147258 A1 * | 12/2008 | | H04M 3/38 |
| WO | WO-2017165948 A1 * | 10/2017 | | G06F 17/30 |

\* cited by examiner

CROSS-JURISDICTIONAL MICROSERVICE-BASED CLOUD PLATFORM DEPLOYMENT

CROSS-REFERENCE TO RELATED APPLICATION

This patent application claims priority to U.S. Patent Application No. 62/837,630, filed on Apr. 23, 2019, and entitled "SYSTEMS AND METHODS FOR PROVIDING CROSS-BORDER MICROSERVICE-BASED CLOUD APPLICATIONS." The disclosure of the prior Application is considered part of and is incorporated by reference into this patent application.

BACKGROUND

Different jurisdictions may have different regulations and/or requirements relating to software deployment. Moreover, different jurisdictions may provide different operational environments for software deployment. For example, a particular jurisdiction (e.g., a country) may be subject to information privacy and data retention laws that may affect operation of a database within the particular jurisdiction. As another example, a particular jurisdiction may establish a firewall separating internal communications within the particular jurisdiction from external communications between entities within the particular jurisdiction and entities outside the particular jurisdiction.

SUMMARY

According to some implementations, a method may include receiving, by an orchestrator device in a first cloud platform in a first jurisdiction, a request from a first module deployed in a second cloud platform in a second jurisdiction, wherein the request is compliant with a jurisdictional characteristic of the second jurisdiction; processing, by the orchestrator device, the request in order to identify a second module deployed in the first cloud platform to which to forward the request; forwarding, by the orchestrator device, the request to the second module to enable fulfillment of the request; receiving, by the orchestrator device, a response from the second module, wherein the response is compliant with a jurisdictional characteristic of the first jurisdiction; processing, by the orchestrator device, the response, to identify a third module deployed in the second cloud platform to which to forward the response; and forwarding, by the orchestrator device, the response, to the third module.

According to some implementations, a system may include one or more memories and one or more processors. In some implementations, the one or more processors are communicatively coupled to the one or more memories. The one or more processors may be configured to: a first cloud platform associated with a first jurisdiction, the first cloud platform including a first set of computing resources allocated to provide a first set of modules, wherein the first set of modules include a first one or more microservices operating in a first one or more containers associated with the first set of computing resources; a second cloud platform associated with a second jurisdiction, the second cloud platform including a second set of computing resources allocated to provide a second set of modules, wherein the second set of modules include a second one or more microservices operating in a second one or more containers associated with the first set of computing resources; a set of internal interfaces to expose the first set of modules to the second set of modules; and an orchestrator device to maintain synchronization of the first cloud platform with the second cloud platform.

According to some implementations, a non-transitory computer-readable medium may store one or more instructions. The one or more instructions, when executed by one or more processors of a device, may cause the one or more processors to receive a request, from a first microservice, of a plurality of microservices deployed in a cloud platform, wherein the first microservice is associated with a first data structure, wherein the request includes tokenized information relating to the first data structure; process the request to identify a second microservice, of the plurality of microservices, associated with a second data structure to which to forward the request; forward the request to the second microservice to enable fulfillment of the request; receive a response from the second microservice, wherein the response includes tokenized information indicating storage of information from the first data structure in the second data structure; and forward the response to the first microservice to complete the request from the first microservice.

DETAILED DESCRIPTION

Figure 1A:
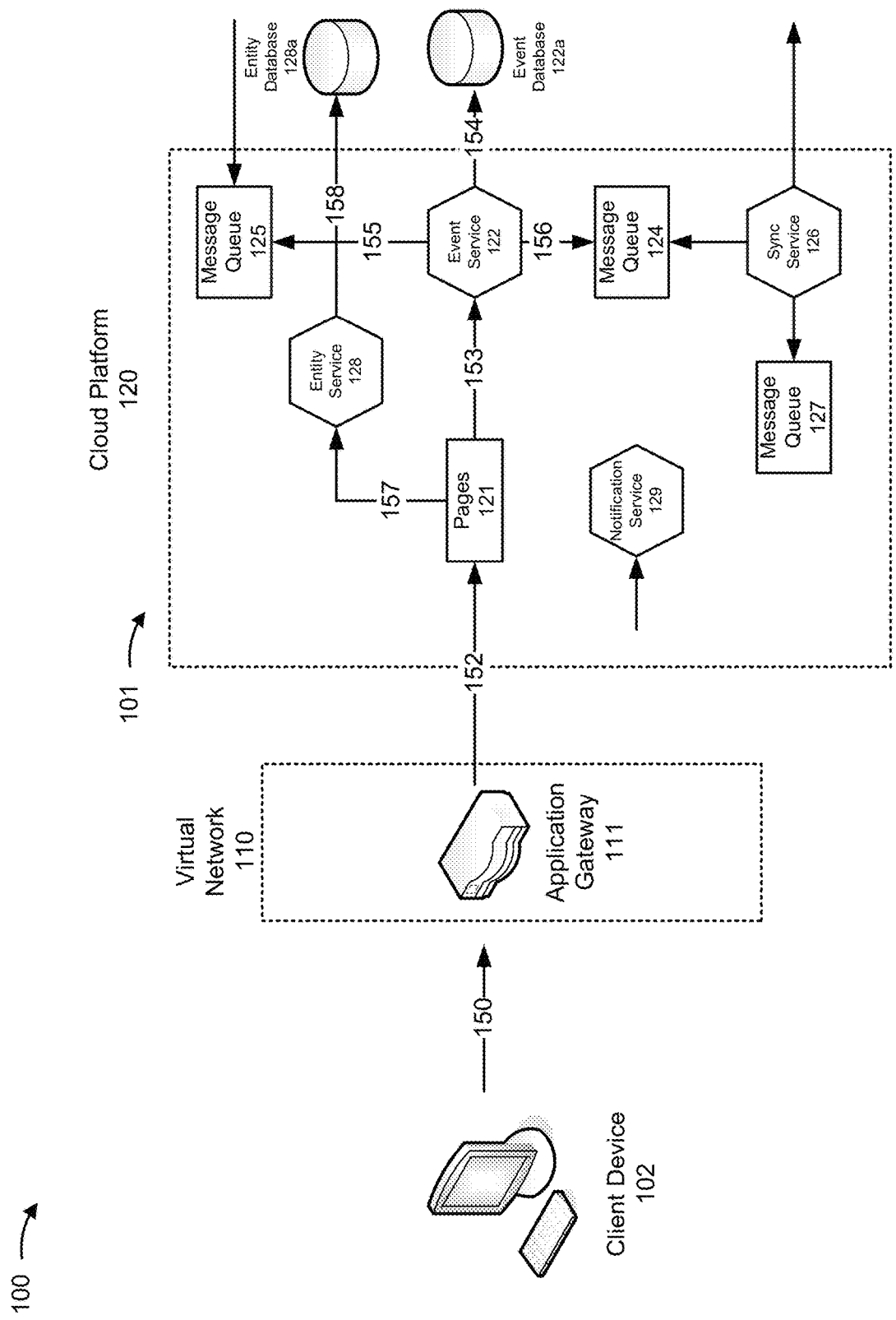
FIGS. 1A-1B are diagrams of an example implementation described herein.

The following detailed description of example implementations refers to the accompanying drawings. The same reference numbers in different drawings may identify the same or similar elements.

Cross jurisdictional software deployment may involve developing versions of a software platform for operation within each jurisdiction that the software platform is to cover. For example, an organization may develop a first version of the software platform for deployment in a first country, a second version of the software platform for deployment in a second country, and/or the like. Alternatively, an organization may develop a first version of the software platform for use within the organization (e.g., for deployment on an intranet) and a second version of the software platform for use outside of the organization (e.g., for deployment on the Internet).

However, developing multiple versions of a software platform may result in an excessive utilization of resources to develop and test multiple versions of each component of the software platform. This may occur even when some components of the software platform are not implicated by inter-jurisdictional issues. Moreover, developing multiple versions of the software platform may result in a lower level of data security resulting from non-secure communications between each version of the software platform. Furthermore, some tools may be available for use in a first jurisdiction (e.g., software debugging tools, software monitoring tools, and/or the like) but may not be available for use in a second jurisdiction. In this case, a lack of access to a tool in a particular jurisdiction may result in an inability to perform debugging or monitoring, which may result in an excessive use of computing resources when a software platform is operating in a manner not as intended.

Some aspects described herein provide an end-to-end decoupled digital architecture to enable cross jurisdictional software deployment. For example, an inter-jurisdictional platform may include a plurality of separate cloud platforms deployed in a plurality of jurisdictions and communicating using asynchronous synchronization services, thereby enabling deployment of a single integrated inter-jurisdictional platform across a plurality of jurisdictions with trusted communication between component cloud platforms in the plurality of jurisdictions. In this case, the inter-jurisdictional platform may include one or more orchestrator devices, such as an orchestrator device associated with a first cloud platform and implemented using computing resources associated with a first jurisdiction. In some implementations, the orchestrator device may communicate with a plurality of modules of one or more second cloud platforms to control operation of the one or more second cloud platforms, such as by performing debugging tasks, monitoring tasks, and/or the like. In some implementations, the orchestrator device may be comprised of a plurality of functionalities, modules, microservices, and/or the like that may communicate to control aspects of an inter-jurisdictional platform.

In this way, the inter-jurisdictional platform may operate in a plurality of jurisdictions while maintaining synchronization and without requiring duplication of platform components not implicated by jurisdiction-specific requirements. Moreover, based at least in part on enabling trusted communication between the plurality of cloud platforms, the inter-jurisdictional platform may enable improved monitoring, debugging, and/or the like, which may improve a utilization of computing resources by reducing an amount of time during which the inter-jurisdictional platform may be functioning improperly as well as reducing a duplication of computing resources to separately monitor and resolve errors in each component cloud platform. Furthermore, based at least in part on deploying a plurality of cloud platforms as components of the inter-jurisdictional platform, the inter-jurisdictional platform may reduce a latency associated with communications to a single, central cloud platform deployed in a single jurisdiction for use in many different jurisdictions.

Figure 1B:
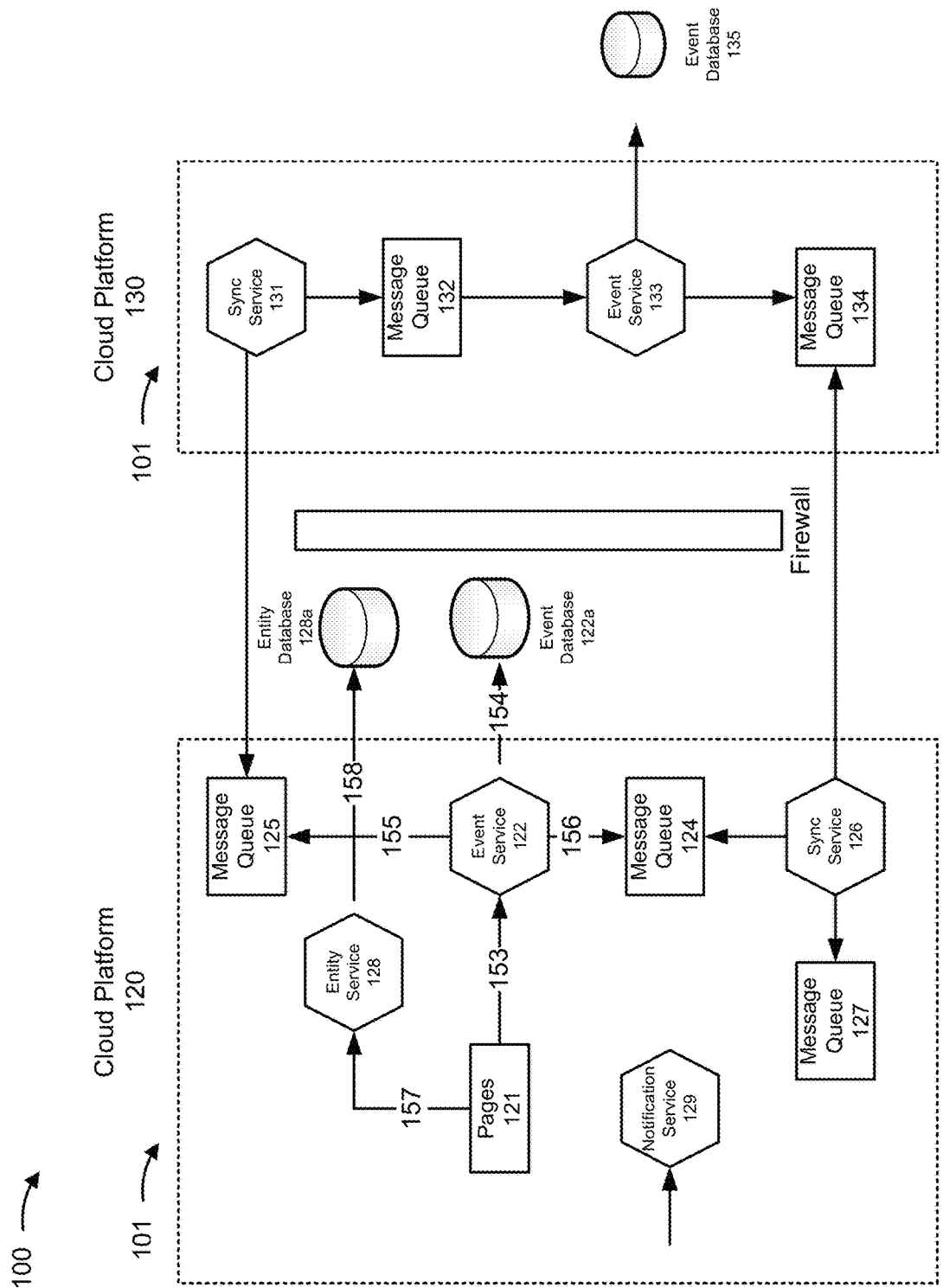

FIGS. 1A-1B are diagrams of an example implementation 100 described herein. FIGS. 1A and 1B show an example implementation 100 of an inter-jurisdictional platform 101, a client device 102, and a virtual network 110. As shown in FIGS. 1A and 1B, inter-jurisdictional platform 101 includes a cloud platform 120 in a first jurisdiction and a cloud platform 130 in a second jurisdiction. In some implementations, cloud platforms 120 and 130 may be cloud computing environments, virtual networks, and/or the like. In some implementations, inter-jurisdictional platform 101 may include, as described in more detail herein, a plurality of cloud platforms, which include a plurality of microservices, deployed in a plurality of jurisdictions. For example, in a reservation context (e.g., hotel reservations), an inter-jurisdictional platform may include a first cloud platform deployed in a first country to interface with users, hotels, etc. in the first country and a second cloud platform deployed in a second country to interface with users, hotels, etc. in the second country.

As further shown in FIG. 1A, and by reference number 150 client device 102 may communicate with virtual network 110, which may include an application gateway 111. As shown by reference number 152, application gateway may enable client device 102 to communicate with cloud platform 120. In some implementations, cloud platform 120 may include a set of pages, microservices, queues, and/or the like and may communicate with a set of databases (or other data structures). For example, with regard to a reservation context (e.g., a hotel reservation use case for inter-jurisdictional platform 101), pages 121 may provide an interface with which a user of client device 102, in a first country, may attempt to reserve a hotel in the first country, in a second country, and/or the like. As shown by reference numbers 153 and 154, pages 121 may provide information to event service 122 (e.g., which may be a microservice) for storage in an event database 122a. For example, when the user is booking a hotel in the second country, pages 121 may provide booking data regarding the user for storage in a booking database. As shown by reference numbers 155 and 156, event service 122 may provide information to message queues 124 and 125 to enable asynchronous communications with cloud platform 130, shown in FIG. 1B. For example, message queues 125 may communicate with a synchronization service 126, which may synchronize a portion of the booking data with one or more databases associated with cloud platform 130. In some implementations, synchronization service 126 may use message queue 127 as a dead letter queue for managing overflow or misdirected messages.

In some implementations, synchronization service 126 (and/or other synchronization services described herein) may receive booking events from other microservices (e.g., event service 122) and may identify another region or microservice to which to provide information regarding the booking event. For example, synchronization service 126 may determine to provide booking data to a microservice of cloud platform 130, as described in more detail here. In some implementations, synchronization service 126 may periodically re-attempt to transmit information regarding an event (e.g., a booking event). For example, synchronization service 126 may determine that a transmission of information regarding an event was unsuccessful and may re-attempt the transmission in accordance with a retry pattern or an exponential back-off policy. As shown in FIG. 1A, cloud platform 120 may include a notification service 129. For example, cloud platform 120 may use notification service 129 to provide notifications regarding a cancellation of a booking, an update of a booking, a request for more user information in advance of the booking, and/or the like.

As further shown in FIG. 1A, and by reference numbers 157 and 158, pages 121 may provide information regarding the request to entity service 128 for storage in entity database 128a. For example, in the reservation context, entity service 128 may access an application programming interface (API) for one or more hotels to enable pages 121 to provide reservation data indicating a creation in a hotel's data. In other words, in the reservation context, event service 122 may create a reservation in a booking database (e.g., to enable a booking provider, such as a hotel aggregation website to track the booking) and entity service 128 may store a reservation in a hotel database (e.g., to enable the hotel to track the booking).

As shown in FIG. 1B, cloud platform 130, which may include synchronization service 131, message queue 132, event service 133, and message queue 134, may be deployed in a different jurisdiction than cloud platform 120. For example, cloud platform 120 and cloud platform 130 may be deployed in different countries. In some implementations, cloud platform 130 and cloud platform 120 may be separated by, for example, a jurisdictional firewall. For example, cloud platform 120 may be deployed in a first country that is firewalled from other countries. In other words, as an example, a jurisdictional firewall may be a firewall applied broadly to Internet traffic rather than a firewall specific to cloud platform 120 and/or an entity that controls cloud platform 120. In this case, based at least in part on deploying two virtual networks, forming a single inter-jurisdictional platform 101, in two countries, inter-jurisdictional platform 101 enables compliance with jurisdiction-specific requirements.

In some implementations, a jurisdiction-specific requirement may include a privacy requirement. For example, when the first jurisdiction has an information privacy requirement, first information that is not compliant with the information privacy requirement may be stored and processed in cloud platform 120 and second information that is compliant with the information privacy requirement may be provided to cloud platform 130 for storage and/or processing. As an example, with regard to the reservation context, user identification information may be received and processed in cloud platform 120 to enable reservation of a hotel in a second jurisdiction that includes cloud platform 130. In this case, cloud platform 120 may asynchronously communicate with cloud platform 130 (e.g., with cloud platform 120 using message queue 125 and synchronization service 126 and with cloud platform 130 using synchronization service 131 and message queue 134). For example, in the reservation context, cloud platform 120 may store booking data in, for example, event database 122*a* or entity database 128*a*, and may provide booking data to cloud platform 130 for storage in, for example, event database 135 and/or the like. In this case, as described in more detail herein, booking data stored in cloud platform 120 may differ from booking data stored in cloud platform 130 in accordance with, for example, data privacy requirements.

In some implementations, a jurisdiction-specific requirement may include a restricted firewall requirement. For example, a first jurisdiction may be separated from one or more second jurisdictions by a jurisdictional firewall. As an example, when cloud platform 120 is deployed in, for example, China and subject to a jurisdictional firewall (e.g., the "Great Firewall of China" (GFC)), cloud platform 120 may maintain certain data in cloud platform 120 to maintain compliance with the jurisdictional firewall and provide other data to cloud platform 130 to comply with restrictions associated with the GFC. Similarly, cloud platform 130 may maintain certain data in cloud platform 130 and provide other data to cloud platform 120 to comply with restrictions associated with the GFC. In this case, based at least in part on cloud platforms 120 and 130 being parts of a single inter-jurisdictional platform, cloud platforms 120 and 130 may complete inter-jurisdictional processes without violating restrictions associated with the GFC.

Via asynchronous communication, microservices of cloud platform 120 may indicate to microservices of cloud platform 130 that a hotel reservation is to be completed for a user and cloud platform 130 may complete the hotel reservation using event service 133 (e.g., which may store the hotel reservation using event database 135) and provide a confirmation back to cloud platform 120 via message queue 134. In this case, information provided from cloud platform 120 to cloud platform 130 includes a token indicating that cloud platform 130 is to establish the reservation rather than personal information for the reservation. Instead, the personal information may be stored and/or processed by microservices of cloud platform 120. In this way, the hotel reservation may be completed without private information being passed to cloud platform 130 in contravention of information privacy requirements, jurisdictional firewall rules, and/or the like.

As indicated above, FIGS. 1A-1B are provided as an example. Other examples may differ from what is described with regard to FIGS. 1A-1B. The number and arrangement of devices shown in FIGS. 1A-1B are provided as an example. In practice, there may be additional devices, fewer devices, different devices, or differently arranged than those shown in FIGS. 1A-1B. Furthermore, two or more devices shown in FIGS. 1A-1B may be implemented within a single device, or a single device shown in FIGS. 1A-1B may be implemented as multiple, distributed devices. Additionally, or alternatively, a set of devices (e.g., one or more devices) shown in FIGS. 1A-1B may perform one or more functions described as being performed by another set of devices shown in FIGS. 1A-1B.

Figure 2:
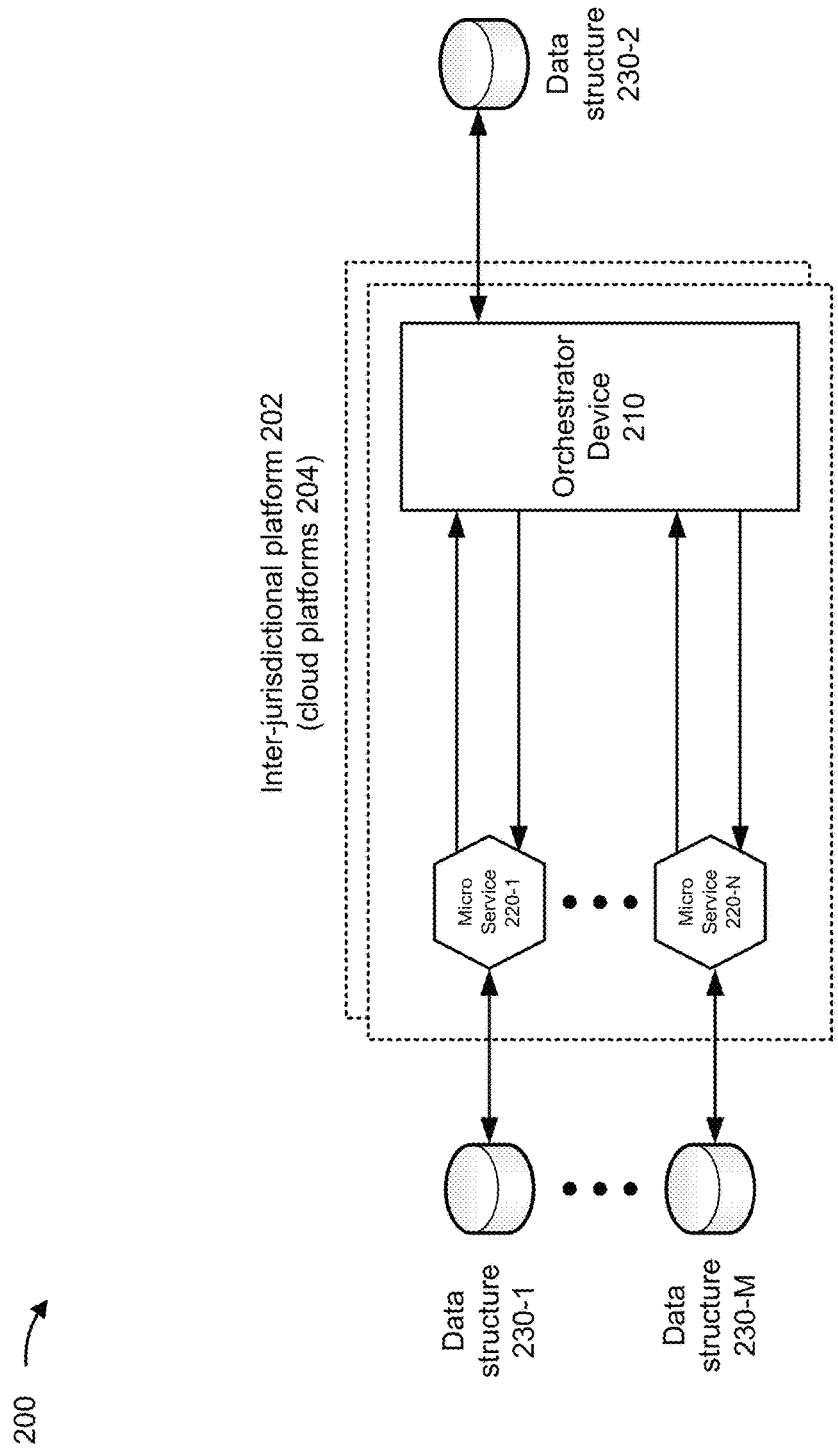
FIG. 2 is a diagram of an example of operation of microservices of an inter-jurisdictional platform using an orchestrator device.

FIG. 2 is a diagram of an example 200 of operation of microservices of an inter-jurisdictional platform using an orchestrator device. As shown in FIG. 2, example 200 includes an inter-jurisdictional platform 202 with a set of cloud platforms 204 deployed in a set of jurisdictions.

As further shown in FIG. 2, inter-jurisdictional platform 202 may include an orchestrator device 210 (e.g., in a cloud platform 204) and one or more microservices 220-1 through 220-N (N≥1). In some implementations, each cloud platform 204 may include an orchestrator device 210. Orchestrator device 210 and/or the one or more microservices 220 may communicate with one or more data structures 230-1 through 230-M (M≥1). For example, in a payment processing context (e.g., ecommerce), orchestrator device 210 (e.g., which may be an event broker, service bus, and/or the like of inter-jurisdictional platform 202) may communicate with a payment microservice 220 (e.g., which may communicate with a payment data structure 230), a card processing microservice 220 (e.g., which may communicate with a card data structure 230 and may tokenize credit card information to satisfy a security criterion), a fraud checking microservice 220 (e.g., which may communicate with a third party fraud detection service to perform a check on whether a purchase is fraudulent), a merchant microservice 220 (e.g., which may communicate with a merchant data structure 230), a customer microservice 220 (e.g., which may communicate with a customer data structure 230), a notification microservice 220, an authentication microservice 220 (e.g., which may communicate with an authentication data structure 230 and/or an external authentication system, such as a social media authentication system, a communication authentication system, a two-factor authentication system, etc.), and/or the like. Additionally, or alternatively, orchestrator device 210 may communicate with one or more modules and/or microservices outside of inter-jurisdictional platform 202, such as a credit card network, a payment provider network, a third party fraud detection service, a legacy network data structure 230 (e.g., storing data relating to legacy payment systems), a set of merchant applications, and/or the like.

In some implementations, orchestrator device 210 may manage communication between microservices 220. For example, orchestrator device 210 may cause a first microservice 220 (e.g., in a cloud network of an inter-jurisdictional platform) to communicate with a second microservice (e.g., in the same cloud network or a different cloud network of the inter-jurisdictional platform). In some implementations, orchestrator device 210 may provide logging information as output to a client device. For example, orchestrator device 210 may provide logging information regarding microservices 220. Additionally, or alternatively, orchestrator device 210 may provide logging information regarding a set of requests, events, traces, dependencies, and/or the like. In some implementations, orchestrator device 210 may provide one or more visualizations of logging information, such as time scale data regarding the logging information, latency data regarding a set of requests or events, inflow data regarding an inflow of requests, outflow data regarding an outflow of requests, failure rate data, and/or the like.

In some implementations, orchestrator device 210 may provide machine learning and/or artificial intelligence-based detection of errors based at least in part on monitoring one or more microservices 220. For example, orchestrator device 210 may perform pattern analysis to compare data regarding the one or more microservices 220 to data regarding past operations of an inter-jurisdictional platform to proactively identify an upcoming or already-occurring issue. In this case, based at least in part on identifying an upcoming or already-occurring issue, orchestrator device 210 may perform one or more response actions. Additionally, or alternatively, orchestrator device 210 may identify a code coverage issue, an issue with a new microservice that is to be deployed, and/or the like based at least in part on executing a set of tests.

In some implementations, the one or more response actions may include providing results of execution of a set of test cases for display. For example, orchestrator device 210 may provide the results for display on a client device. In this way, orchestrator device 210 may enable a software tester to view the results and assess and/or modify the software being tested (e.g., microservices of the inter-jurisdictional platform), the set of test cases applied, and/or the like, which improves testing and quality of the software associated with the software development platform.

In some implementations, the one or more response actions may include providing recommendations for new test cases or different test cases based on results or executing an aforementioned test case. For example, if the results indicate that an already deployed microservice 220 or a microservice 220 that is scheduled for deployment includes one or more bugs, orchestrator device 210 may recommend a test case to check for the one or more bugs. In this way, the testing platform may provide improved testing scenarios that may be more likely to effectively test and improve the quality of the operation of the inter-jurisdictional platform.

In some implementations, the one or more response actions may include orchestrator device 210 providing recommendations for corrections to a microservice 220 based on the results. For example, orchestrator device 210 may use a set of pre-configured recommendations or may generate recommendations based at least in part on supervised machine learning applied to previous resolutions to problems. In this case, a recommendation may relate to altering resource allocations to a microservice 220, changing dependencies between microservices 220, and/or the like. In this way, the testing platform may automatically facilitate modifications that will eliminate or reduce software errors (e.g., and conserve resources associated with identifying and correcting such errors), while enabling a software tester to make final decisions as to implementing the modifications, which may improve the quality of the software associated with the inter-jurisdictional platform.

In some implementations, the one or more response actions may include orchestrator device 210 causing the corrections to the software to be automatically implemented. For example, orchestrator device 210 may implement one or more of the aforementioned recommendations, such as by altering a resource allocation for a microservice 220 and/or the like. In this way, the inter-jurisdictional platform may eliminate the need for manual implementation of the software corrections, may shorten a time required to deploy new functionalities, may conserve resources associated with identifying and correcting software errors, and/or the like.

As indicated above, FIG. 2 is provided as an example. Other examples may differ from what is described with regard to FIG. 2. The number and arrangement of devices shown in FIG. 2 are provided as an example. In practice, there may be additional devices, fewer devices, different devices, or differently arranged than those shown in FIG. 2. Furthermore, two or more devices shown in FIG. 2 may be implemented within a single device, or a single device shown in FIG. 2 may be implemented as multiple, distributed devices. Additionally, or alternatively, a set of devices (e.g., one or more devices) shown in FIG. 2 may perform one or more functions described as being performed by another set of devices shown in FIG. 2.

Figure 3:
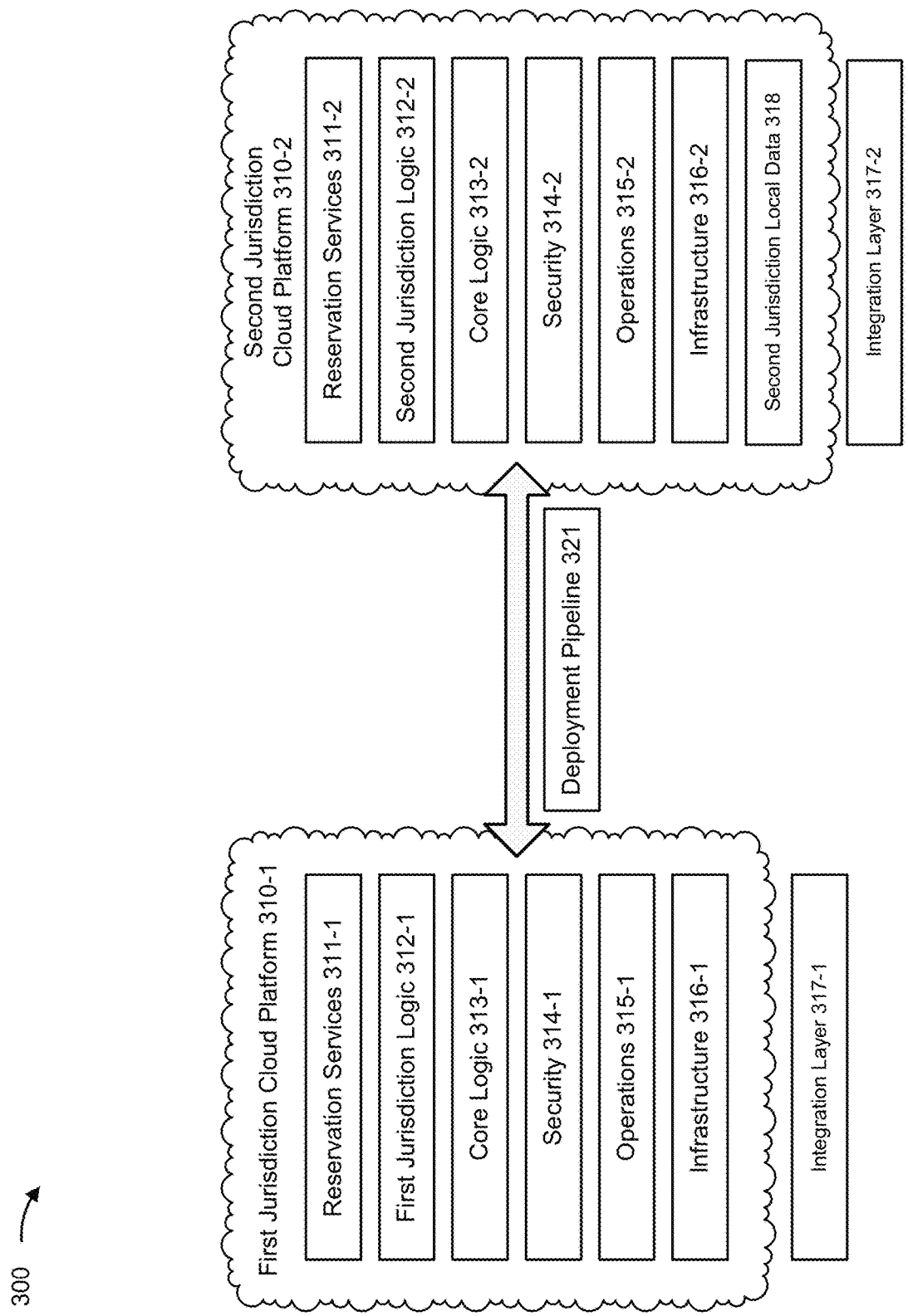
FIG. 3 is a diagram of a dual-cloud network configuration with a deployment pipeline.

FIG. 3 is a diagram of a layer representation of an inter-jurisdictional platform 300 with a deployment pipeline. As shown in FIG. 3, inter-jurisdictional platform 300 may include a set of cloud platforms 310 with a deployment pipeline 321 to enable deployment of code, functionalities, modules, and/or the like.

As shown in FIG. 3, a cloud platform 310-1 of a first jurisdiction may include a set of modules, such as reservation services layer 311-1, a jurisdictional logic layer 312-1, a core logic layer 313-1, a security layer 314-1, an operations layer 315-1, and an infrastructure layer 316-1. In some implementations, an integration layer 317-1 to provide integration services to cloud platform 310-1 for client devices in the first jurisdiction. Similarly, a cloud platform 310-2 of a second jurisdiction may include a reservation services layer 311-2, a jurisdictional logic layer 312-2, a core logic layer 313-2, a security layer 314-2, an operations layer 315-2, and an infrastructure layer 316-2. In some implementations, cloud platform 310-2 may include a local data layer 318 for the second jurisdiction. In some implementations, cloud platform 310 may include an integration layer 317-2.

In some implementations, cloud platform 310-1 may be a central cloud network and cloud platform 310-2 may be a client cloud network. For example, cloud platform 310-1 may be a core virtual network for an organization (e.g., co-located with a core business of the organization) and cloud platform 310-2 may be one of multiple client networks (e.g., deployed in other jurisdictions than a jurisdiction of the core business of the organization). In this case, an organization may deploy (e.g., using, for example, an orchestrator device of cloud platform 310-1 to control deployment via deployment pipeline 321) cloud platforms 310 in each jurisdiction to which the organization is to provide an application. In this way, an architecture of cloud platforms 310 enables rapid deployment of an application of cloud platforms 310 to different jurisdictions while maintaining the central network in a particular jurisdiction.

In some implementations, cloud platform 310-1 and/or cloud platform 310-2 may perform automated unit testing on deployments via deployment pipeline 321. For example, when deploying a new microservice or functionality to cloud platform 310-2 via deployment pipeline 321, cloud platform 310-1 and/or cloud platform 310-2 may use an automated testing platform operating on cloud platform 310-1 and/or cloud platform 310-2 to perform unit testing via a set of test scripts to identify compliance with one or more jurisdictional characteristics of the second jurisdiction, to identify whether a new microservice is operating as intended, and/or the like. In some implementations, a cloud platform 310 may automatically resolve an identified issue. For example, based at least in part on identifying, for a microservice associated with a database, a compliance issue associated with a data privacy, cloud platform 310-2 may use a machine learning technique to adjust one or more parameters of a database (e.g., how long to store data generated by the microservice, which data generated by the microservice to store, and/or the like) to ensure that the microservice is in compliance with a data privacy requirement In some implementations, cloud platform 310-1 may perform one or more functionalities for cloud platform 310-2 via deployment pipeline 321. For example, when the first jurisdiction has access to a toolset (e.g., a development operations toolset) and the second jurisdiction does not have access to the toolset (e.g., as a result of geographic restrictions on the toolset, jurisdictional restrictions in the second jurisdiction, and/or the like), cloud platform 310-1 may use deployment pipeline 321 to access cloud platform 310-2 and operate the toolset on cloud platform 310-2. For example, cloud platform 310-1 may analyze code, perform testing, modify code, change permissions, and/or the like within cloud platform 310-2. In this way, by deploying cloud platforms 310 as separate entities within a single inter-jurisdictional platform 300, the inter-jurisdictional platform obviates issues with using toolsets across jurisdictions, thereby obviating a need for systems in, for example, the second jurisdiction to perform code analysis, testing, and/or the like. Furthermore, by obviating a need for systems in the second jurisdiction, the inter-jurisdictional platform may reduce a utilization of computing resources relative to operating cloud network testing resources in each jurisdiction in which a cloud network operates.

In some implementations, each jurisdiction may have a separate deployment pipeline 321. For example, cloud platform 310-1 may have a plurality of deployment pipelines 321 to a plurality of second cloud platforms 310-2 in a plurality of second jurisdictions. In some implementations, cloud platform 310-1 may generate a build for a module deployed via a deployment pipeline 321. For example, cloud platform 310-1 may generate an image of a container of the module, set up a set of environment variables, and/or the like. In some implementations, cloud platform 310-1 may communicate with a resource group, a container registry, a cloud storage account, a key vault (e.g., providing secure storage of application data), and/or the like to deploy, for example, a new environment. Similarly, to deploy an infrastructure item, cloud platform 310-1 may communicate with a storage account, a key vault, an application insights (e.g., a logging functionality), and/or the like. Similarly, to deploy an application, cloud platform 310-1 may deploy a microservice for the application, a configuration for the microservice, a container image, and/or the like. In this case, cloud platform 310-1 may subsequently deploy resources and/or microservices using deployment pipeline 321.

In some implementations, reservation services layer 311 may include one or more microservices providing, in a hotel reservation context, hotel reservation creation, modification, cancellation and/or the like. For example, each cloud platform 310 may include a separate reservation services 311 microservice to enable completion of reservations by a customer in a corresponding jurisdiction, for a hotel in a corresponding jurisdiction, and/or the like. In another example, another type of services layer may be deployed in cloud platforms 310, such as a payment processing layer and/or the like.

As described above, when a reservation involves inter-jurisdictional interaction (e.g., a customer in a first jurisdiction booking a hotel in a second jurisdiction) reservations services layer 311-1 may communicate reservation services layer 311-2 (e.g., asynchronously, using tokenized data, via an orchestrator device, and/or the like, as described above) to complete the inter-jurisdictional interaction. In this case, based at least in part on deploying reservations services layer 311 in different jurisdictions' cloud platforms 310, each reservation services layer 311 may be localized to a corresponding jurisdiction, provide improved performance (e.g., from localized instances of software and data replication), and/or the like.

In some implementations, jurisdictional logic layer 312 and core logic layer 313 may include one or more functionalities assigned to implementing a set of rules for a cloud platform 310. For example, core logic layer 313 may implement rules across inter-jurisdictional platform 300 and jurisdictional logic layer 312 may implement rules specific to a particular jurisdiction.

In some implementations, security layer 314 may include one or more functionalities associated with enforcing one or more security policies for a cloud platform 310. For example, security layer 314 may enforce data privacy rules, data scanning rules, jurisdiction-specific rules, and/or the like. Additionally, or alternatively, security layer 314 may validate compliance with one or more requirements of, for example, a particular jurisdiction. In some implementations, an architecture of an inter-jurisdictional platform that includes cloud platforms 310 enables functionalities of security layer 314. For example, cloud platforms 310 may use security layer 314 to provide and/or manage containerization, open access web application security techniques, security during deployment techniques, security rules for compliance techniques, multi-factor authentication, data encryption, key management, and/or the like. In some implementations, modules of security layer 314 may operate a key vault system to securely store information for a cloud platform 310.

In some implementations, security layer 314 (e.g., and/or functionalities thereof) may perform static code scanning of code deployed in a cloud platform 310. For example, security layer 314 may periodically scan code (e.g., before the code is run in a cloud platform 310) to debug the code. In this case, security layer 314 may use static scanning techniques, machine learning techniques, and/or the like to examine the code, identify weaknesses in the code (e.g., security vulnerabilities, runtime errors, etc.), perform response actions, and/or the like. For example, security layer 314 may, as a response action, prevent the code from running, automatically assign the code to a developer for review and error correction, automatically correct the code (e.g., using predefined functions, machine learning analysis of other code, etc.), and/or the like.

In some implementations, security layer 314 may include a key vault. For example, cloud platform 310-1 may store secure information in a key vault for each microservice deployed in cloud platform 310-1. In this case each microservice may use security credentials to access corresponding secure information in the key vault, thereby reducing a likelihood of security vulnerabilities from a malicious entity obtaining access to a microservice.

In some implementations, operations layer 315 and infrastructure layer 316 may include one or more functionalities to support deployment of a cloud platform 310. For example, operations layer 315 and infrastructure layer 316 may provision computing resources for supporting cloud platform 310 using infrastructure as code (IaC) techniques. Based at least in part on organizing a different client network for each jurisdiction, operations layer 315 and infrastructure layer 316 enable each corresponding cloud platform 310 to be customized to rules and characteristics of each corresponding jurisdiction, market conditions of each corresponding jurisdiction, third party services operating in each corresponding jurisdiction, and/or the like. In some implementations, operations layer 315 and infrastructure layer 316 provide improved performance for cloud platform 310 relative to other architectures, such as a single central architecture with which client devices in each jurisdiction communicate. For example, each cloud platform 310 includes direct physical connections to client devices (e.g., computers, user devices, etc.) in each corresponding jurisdiction. Additionally, or alternatively, each cloud platform 310 may have local instances of software and replication of data to enable improved performance. For example, as shown, cloud platform 310-2 may have local data structures (e.g., local data layer 318) particular to each jurisdiction to reduce latency and improve performance relative to centralizing all data in a single jurisdiction. Additionally, or alternatively, cloud platforms 310 may use asynchronous communications to replicate and synchronize data across cloud platforms 310 of a single inter-jurisdictional platform.

In some implementations, cloud platforms 310 may have applications, interfaces, microservices, and/or the like particular to each jurisdiction. For example, cloud platform 310-1 may integrate a chat functionality that is used in the first jurisdiction and a cloud platform 310-2 may integrate a chat functionality that is used in the second jurisdiction (and may not be available in the first jurisdiction). In this case, cloud platform 310-1, for example, may integrate the chat functionality as an identity provider, a payment processor, and/or the like via an application programming interface (API) of cloud platform 310-1, a server providing the chat functionality, and/or the like. In this way, cloud platform 310-1 and an inter-jurisdictional platform that includes cloud platform 310-1 leverage cloud platform 310-1 for jurisdiction-specific functionalities without having to deploy the jurisdiction-specific functionalities in jurisdictions where such jurisdiction-specific functionalities are not useful (e.g., where the first chat functionality is unavailable or unadopted by users). Additionally, or alternatively, cloud platform 310-1 may deploy a functionality as a test feature for a pilot audience before the functionality is deployed to another audience in cloud platform 310-2, thereby improving flexibility in management of cloud platform functionalities.

As indicated above, FIG. 3 is provided as an example. Other examples may differ from what is described with regard to FIG. 3. The number and arrangement of devices shown in FIG. 3 are provided as an example. In practice, there may be additional devices, fewer devices, different devices, or differently arranged than those shown in FIG. 3. Furthermore, two or more devices shown in FIG. 3 may be implemented within a single device, or a single device shown in FIG. 3 may be implemented as multiple, distributed devices. Additionally, or alternatively, a set of devices (e.g., one or more devices) shown in FIG. 3 may perform one or more functions described as being performed by another set of devices shown in FIG. 3.

Figure 4:
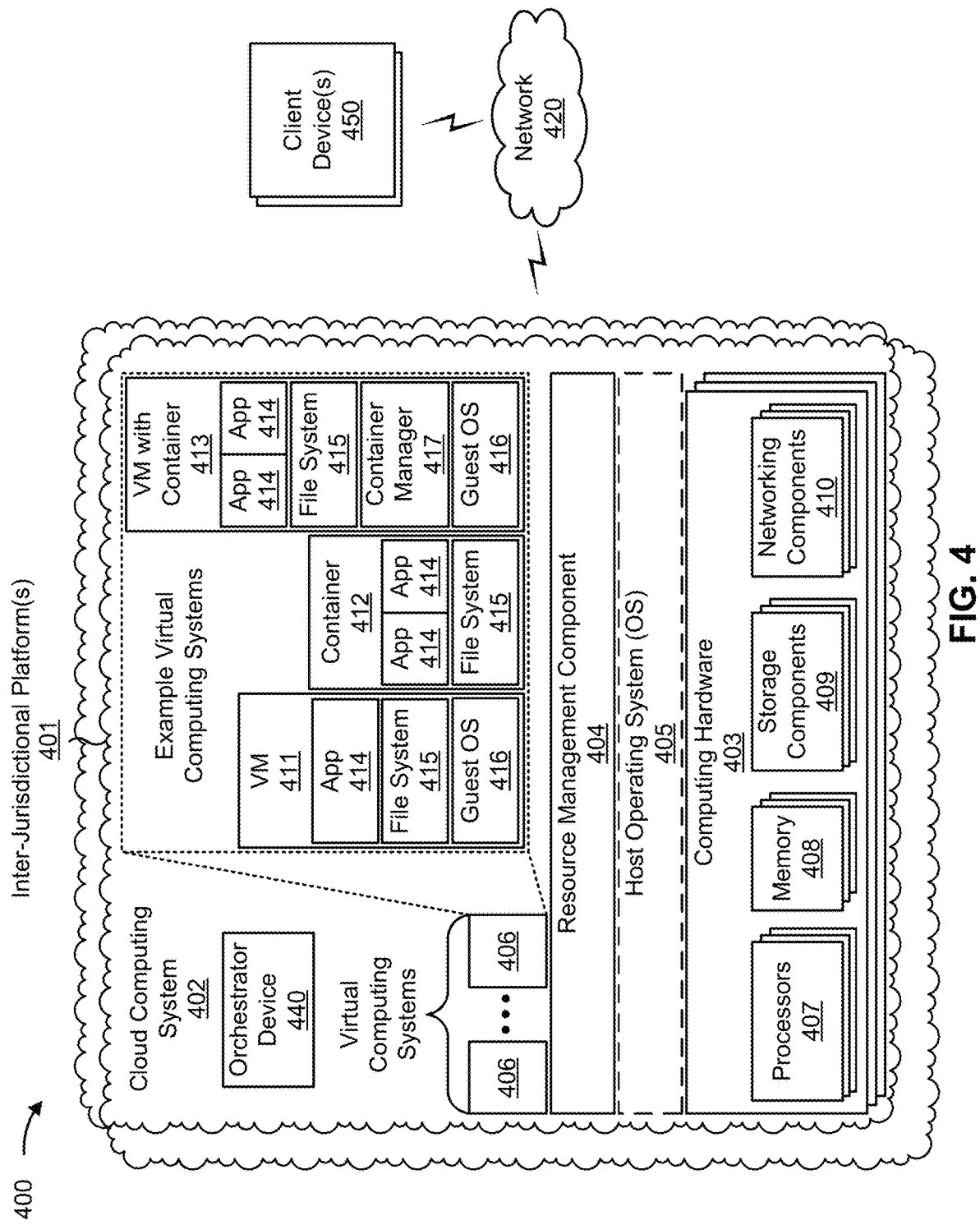
FIG. 4 is a diagram of an example environment in which systems and/or methods described herein may be implemented.

FIG. 4 is a diagram of an example environment 400 in which systems and/or methods described herein may be implemented. As shown in FIG. 4, environment 400 may include an inter-jurisdictional platform 401. The inter-jurisdictional platform 401 may include one or more elements of a cloud computing system 402 and/or may execute within the cloud computing system 402 (e.g., as one or more virtual computing systems 406). The cloud computing system 402 may include one or more elements 403-417, as described in more detail below. As further shown in FIG. 4, environment 400 may include a network 420, an orchestrator device 440, and/or a client device 450. Devices of environment 400 may interconnect via wired connections, wireless connections, or a combination of wired and wireless connections.

The cloud computing system 402 includes computing hardware 403, a resource management component 404, a host operating system (OS) 405, and/or one or more virtual computing systems 406. The resource management component 404 may perform virtualization (e.g., abstraction) of computing hardware 403 to create the one or more virtual computing systems 406. Using such virtualization, the resource management component 404 enables a single computing device (e.g., a computer, a server, a host device, and/or the like) to operate as if the single computing device were multiple computing devices, such as by creating multiple isolated virtual computing systems 406 from computing hardware 403 of the single computing device. The multiple virtual computing systems 406 operate independently from one another and do not interact with one another. In this way, computing hardware 403 can operate more efficiently, with lower power consumption, higher reliability, higher availability, higher utilization, greater flexibility, and lower cost than using separate computing devices.

Computing hardware 403 includes hardware and corresponding resources from one or more computing devices. For example, computing hardware 403 may include hardware from a single computing device (e.g., a single server or host device) or from multiple computing devices (e.g., multiple servers or host devices), such as multiple computing devices in one or more data centers, server farms, server pools, and/or the like. As shown, computing hardware 403 may include one or more processors 407, one or more memories 408, one or more storage components 409, and/or one or more networking components 410. Computing hardware 403 may be interconnected via one or more wired and/or wireless buses, which may interconnect computing hardware 403 within a single computing device and/or across multiple computing devices.

A processor 407 includes a central processing unit, a graphics processing unit, and/or the like. A memory 408 includes random access memory, read-only memory, and/or the like. The memory 408 may store a set of instructions (e.g., one or more instructions) for execution by the processor 407. The processor 407 may execute the set of instructions to perform one or more operations or processes described herein. In some implementations, execution of the set of instructions, by one or more processors 407, causes the one or more processors 407 and/or the inter-jurisdictional platform 401 to perform one or more operations or processes described herein. A storage component 409 includes a hard disk or another type of storage device that stores information, data, and/or software (e.g., code, instructions, and/or the like) related to the operation and use of the inter-jurisdictional platform 401. In some implementations, memory 408 and/or storage component 409 is/are implemented as a non-transitory computer readable medium. A networking component 410 includes a network interface and corresponding hardware that enables the inter-jurisdictional platform 401 to communicate with other devices of environment 400 via a wired connection and/or a wireless connection, such as via network 420. Additional examples of a processor, a memory, a storage component, and a networking component (e.g., a communication interface) are described elsewhere herein.

The resource management component 404 includes a virtualization application (e.g., executing on hardware, such as computing hardware 403) capable of virtualizing computing hardware 403 to start (e.g., create or spin up), stop (e.g., delete or tear down), and/or manage one or more virtual computing systems 406. Such virtualization may include operating system virtualization, shared kernel virtualization (e.g., container-based virtualization), kernel level virtualization, hypervisor virtualization, paravirtualization, full virtualization, hardware virtualization, and/or the like. The resource management component 404 may control access to and/or use of computing hardware 403 and/or software executing on computing hardware 403. Additionally, or alternatively, the resource management component 404 may perform binary rewriting to scan instructions received from a virtual computing system 406 and replace any privileged instructions with safe emulations of those instructions. The resource management component 404 may include a hypervisor or a virtual machine monitor, such as when the virtual computing systems 406 are virtual machines 411. Additionally, or alternatively, the resource management component 404 may include a container manager, such as when the virtual computing systems 406 are containers 412.

In some implementations, the resource management component 404 executes within and/or in coordination with a host operating system 405. For example, the resource management component 404 may execute on top of the host operating system 405 rather than interacting directly with computing hardware 403, such as when the resource management component 404 is a hosted hypervisor (e.g., a Type 2 hypervisor) or a container manager. In this case, the host operating system 405 may control access to and/or use of computing hardware 403 and/or software executing on computing hardware 403 based on information and/or instructions received from the resource management component 404. Alternatively, the resource management component 404 may interact directly with computing hardware 403 rather than interacting with the host operating system 405, such as when the resource management component 404 is a bare-metal hypervisor (e.g., a Type 1 hypervisor). Thus, in some implementations, the cloud computing system 402 does not include a host operating system 405. In some implementations, the host operating system 405 includes and/or executes an administrator application to enable a system administrator to manage, customize, and/or configure cloud computing system 402.

A virtual computing system 406 includes a virtual environment that enables cloud-based execution of operations and/or processes described herein using computing hardware 403. As shown, a virtual computing system 406 may include a virtual machine 411, a container 412, a hybrid environment 413 that includes a virtual machine and a container, and/or the like. A virtual computing system 406 may execute one or more applications 414 using a file system 415. The file system 415 may include binary files, software libraries, and/or other resources required to execute applications 414 on a guest operating system 416 or the host operating system 405. In some implementations, a virtual computing system 406 (e.g., a virtual machine 411 or a hybrid environment 413) includes a guest operating system 416. In some implementations, a virtual computing system 406 (e.g., a container 412 or a hybrid environment 413) includes a container manager 417.

A virtual machine 411 is an emulation of a computing device that enables execution of separate, isolated instances of virtual computing devices (e.g., multiple virtual machines 411) on the same computing hardware 403. The guest operating systems 416 and applications 414 of multiple virtual machines 411 may share computing hardware 403 from a single computing device or from multiple computing devices (e.g., a pool of computing devices). Each separate virtual machine 411 may include a guest operating system 416, a file system 415, and one or more applications 414. With a virtual machine 411, the underlying computing hardware 403 is virtualized, and the guest operating system 416 executes on top of this virtualized hardware. Using virtual machines 411 enables different types of guest operating systems 416 to execute on the same computing hardware 403 in an isolated environment, but with more resource usage and overhead than containers 412.

Unlike a virtual machine 411, a container 412 virtualizes a host operating system 405 rather than the underlying computing hardware 403. Thus, a container 412 does not require a guest operating system 416 because the application(s) 414 included in the container 412 execute directly on the host operating system 405 using a file system 415 included in the container 412. Each separate container 412 may share the kernel of the host operating system 405, and different applications 414 within a single container 412 may share a file system 415. This sharing of a file system 415 among multiple applications 414 reduces the need to reproduce operating system code for different applications, and enables a single host operating system 405 to execute multiple applications 414 and/or containers 412. As a result, containers 412 enable a greater quantity of applications 414 to execute on a smaller quantity of computing devices as compared to virtual machines 411.

A hybrid environment 413 includes elements of a virtual machine 411 and a container 412. For example, a hybrid environment 413 may include a guest operating system 416 that executes on top of virtualized hardware. A container manager 417 may execute on top of the guest operating system 416 to start, stop, and/or manage one or more containers within the hybrid environment 413. Using a hybrid environment 413 enables different types of guest operating systems 416 to execute on the same computing hardware 403 in an isolated environment, while also enabling lightweight containers to execute on top of the guest operating system 416.

The quantity of applications 414 shown in FIG. 4 as executing within each virtual computing system 406 is shown as an example, and a different quantity of applications 414 may execute within each virtual computing system. Furthermore, although the inter-jurisdictional platform 401 may include one or more elements 403-417 of the cloud computing system 402, may execute within the cloud computing system 402, and/or may be hosted within the cloud computing system 402, in some implementations, the inter-jurisdictional platform 401 may not be cloud-based (e.g., may be implemented outside of a cloud computing system) or may be partially cloud-based. For example, the inter-jurisdictional platform 401 may include one or more devices that are not part of the cloud computing system 402, such as device 500 of FIG. 5 which may include a standalone server or another type of computing device. The inter-jurisdictional platform 401 may perform one or more operations and/or processes described in more detail elsewhere herein.

Network 420 includes one or more wired and/or wireless networks. For example, network 420 may include a cellular network (e.g., a fifth generation (5G) network, a fourth generation (4G) network, a long-term evolution (LTE) network, a third generation (3G) network, a code division multiple access (CDMA) network, etc.), a public land mobile network (PLMN), a local area network (LAN), a wide area network (WAN), a metropolitan area network (MAN), a telephone network (e.g., the Public Switched Telephone Network (PSTN)), a private network, an ad hoc network, an intranet, the Internet, a fiber optic-based network, and/or the like, and/or a combination of these or other types of networks. The network 420 enables communication among the devices of environment 400.

The orchestrator device 440 may include one or more computing resources of cloud computing system 402 allocated to performing management and intra-microservice communication management for cloud computing system 402 of inter-jurisdictional platform 401. For example, orchestrator device 440 may receive and route requests from microservices of inter-jurisdictional platform 401 and using synchronization services and message queues deployed in one or more jurisdictions. In this way, orchestrator device 440 enables asynchronous communication in inter-jurisdictional platform 401, end-to-end status tracking in inter-jurisdictional platform 401, and/or the like, as described above.

The client device 450 includes one or more devices capable of receiving, generating, storing, processing, and/or providing information associated with inter-jurisdictional platform 401. The client device 450 may include a communication device and/or a computing device. For example, the client device 450 may include a wireless communication device, a user equipment (UE), a mobile phone (e.g., a smart phone or a cell phone, among other examples), a laptop computer, a tablet computer, a handheld computer, a desktop computer, a gaming device, a wearable communication device (e.g., a smart wristwatch or a pair of smart eyeglasses, among other examples), an Internet of Things (IoT) device, or a similar type of device. The client device 450 may communicate with one or more other devices of environment 400, as described elsewhere herein.

The number and arrangement of devices and networks shown in FIG. 4 are provided as an example. In practice, there may be additional devices and/or networks, fewer devices and/or networks, different devices and/or networks, or differently arranged devices and/or networks than those shown in FIG. 4. Furthermore, two or more devices shown in FIG. 4 may be implemented within a single device, or a single device shown in FIG. 4 may be implemented as multiple, distributed devices. Additionally, or alternatively, a set of devices (e.g., one or more devices) of environment 400 may perform one or more functions described as being performed by another set of devices of environment 400.

Figure 5:
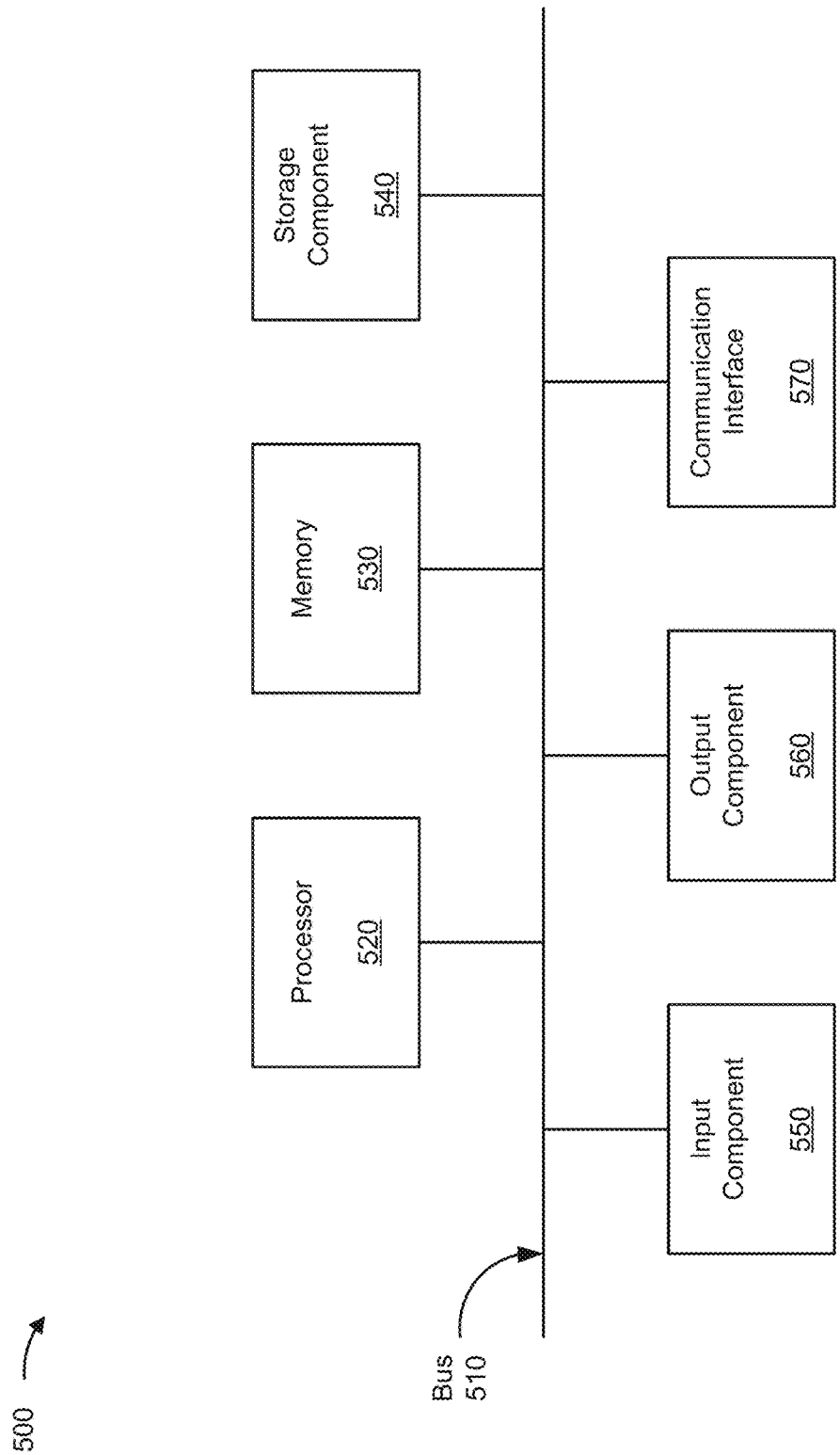
FIG. 5 is a diagram of example components of one or more devices of FIG. 2.

FIG. 5 is a diagram of example components of a device 500. Device 500 may correspond to orchestrator device 440 and/or client device 450. In some implementations, orchestrator device 440 and/or client device 450 may include one or more devices 500 and/or one or more components of device 500. As shown in FIG. 5, device 500 may include a bus 510, a processor 520, a memory 530, a storage component 540, an input component 550, an output component 560, and a communication interface 570.

Bus 510 includes a component that permits communication among the components of device 500. Processor 520 is implemented in hardware, firmware, or a combination of hardware and software. Processor 520 is a central processing unit (CPU), a graphics processing unit (GPU), an accelerated processing unit (APU), a microprocessor, a microcontroller, a digital signal processor (DSP), a field-programmable gate array (FPGA), an application-specific integrated circuit (ASIC), or another type of processing component. In some implementations, processor 520 includes one or more processors capable of being programmed to perform a function. Memory 530 includes a random access memory (RAM), a read only memory (ROM), and/or another type of dynamic or static storage device (e.g., a flash memory, a magnetic memory, and/or an optical memory) that stores information and/or instructions for use by processor 520.

Storage component 540 stores information and/or software related to the operation and use of device 500. For example, storage component 540 may include a hard disk (e.g., a magnetic disk, an optical disk, a magneto-optic disk, and/or a solid state disk), a compact disc (CD), a digital versatile disc (DVD), a floppy disk, a cartridge, a magnetic tape, and/or another type of non-transitory computer-readable medium, along with a corresponding drive.

Input component 550 includes a component that permits device 500 to receive information, such as via user input (e.g., a touch screen display, a keyboard, a keypad, a mouse, a button, a switch, and/or a microphone). Additionally, or alternatively, input component 550 may include a sensor for sensing information (e.g., a global positioning system (GPS) component, an accelerometer, a gyroscope, and/or an actuator). Output component 560 includes a component that provides output information from device 500 (e.g., a display, a speaker, and/or one or more LEDs).

Communication interface 570 includes a transceiver-like component (e.g., a transceiver and/or a separate receiver and transmitter) that enables device 500 to communicate with other devices, such as via a wired connection, a wireless connection, or a combination of wired and wireless connections. Communication interface 570 may permit device 500 to receive information from another device and/or provide information to another device. For example, communication interface 570 may include an Ethernet interface, an optical interface, a coaxial interface, an infrared interface, an RF interface, a universal serial bus (USB) interface, a wireless local area interface, a cellular network interface, and/or the like.

Device 500 may perform one or more processes described herein. Device 500 may perform these processes based on processor 520 executing software instructions stored by a non-transitory computer-readable medium, such as memory 530 and/or storage component 540. A computer-readable medium is defined herein as a non-transitory memory device. A memory device includes memory space within a single physical storage device or memory space spread across multiple physical storage devices.

Software instructions may be read into memory 530 and/or storage component 540 from another computer-readable medium or from another device via communication interface 570. When executed, software instructions stored in memory 530 and/or storage component 540 may cause processor 520 to perform one or more processes described herein. Additionally, or alternatively, hardwired circuitry may be used in place of or in combination with software instructions to perform one or more processes described herein. Thus, implementations described herein are not limited to any specific combination of hardware circuitry and software.

The number and arrangement of components shown in FIG. 5 are provided as an example. In practice, device 500 may include additional components, fewer components, different components, or differently arranged components than those shown in FIG. 5. Additionally, or alternatively, a set of components (e.g., one or more components) of device 500 may perform one or more functions described as being performed by another set of components of device 500.

Figure 6:
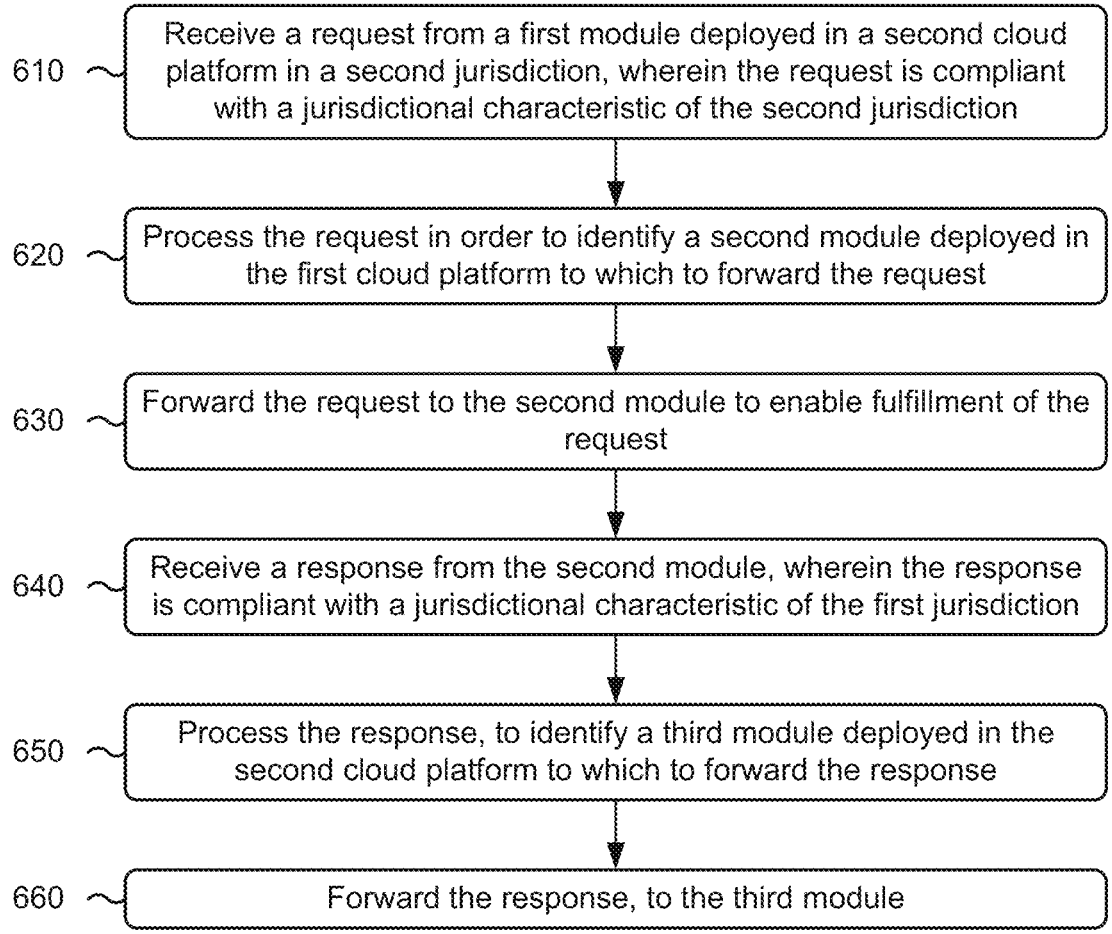
FIG. 6 is a flow chart of an example process relating to cross jurisdictional microservice-based cloud platform deployment.

FIG. 6 is a flow chart of an example process 600 for cross jurisdictional microservice-based cloud platform deployment. In some implementations, one or more process blocks of FIG. 6 may be performed by an orchestrator device (e.g., orchestrator device 440). In some implementations, one or more process blocks of FIG. 6 may be performed by another device or a group of devices separate from or including the orchestrator device, such as a client device (e.g., client device 450) and/or the like.

As shown in FIG. 6, process 600 may include receiving a request from a first module deployed in a second cloud platform in a second jurisdiction, wherein the request is compliant with a jurisdictional characteristic of the second jurisdiction (block 610). For example, the orchestrator device (e.g., using processor 520, memory 530, storage component 540, input component 550, output component 560, communication interface 570, and/or the like) may receive a request from a first module deployed in a second cloud platform in a second jurisdiction, as described above. In some implementations, the request is compliant with a jurisdictional characteristic of the second jurisdiction.

As further shown in FIG. 6, process 600 may include processing the request in order to identify a second module deployed in the first cloud platform to which to forward the request (block 620). For example, the orchestrator device (e.g., using processor 520, memory 530, storage component 540, input component 550, output component 560, communication interface 570, and/or the like) may process the request in order to identify a second module deployed in the first cloud platform to which to forward the request, as described above.

As further shown in FIG. 6, process 600 may include forwarding the request to the second module to enable fulfillment of the request (block 630). For example, the orchestrator device (e.g., using processor 520, memory 530, storage component 540, input component 550, output component 560, communication interface 570, and/or the like) may forward the request to the second module to enable fulfillment of the request, as described above.

As further shown in FIG. 6, process 600 may include receiving a response from the second module, wherein the response is compliant with a jurisdictional characteristic of the first jurisdiction (block 640). For example, the orchestrator device (e.g., using processor 520, memory 530, storage component 540, input component 550, output component 560, communication interface 570, and/or the like) may receive a response from the second module, as described above. In some implementations, the response is compliant with a jurisdictional characteristic of the first jurisdiction.

As further shown in FIG. 6, process 600 may include processing the response, to identify a third module deployed in the second cloud platform to which to forward the response (block 650). For example, the orchestrator device (e.g., using processor 520, memory 530, storage component 540, input component 550, output component 560, communication interface 570, and/or the like) may process the response, to identify a third module deployed in the second cloud platform to which to forward the response, as described above.

As further shown in FIG. 6, process 600 may include forwarding the response, to the third module (block 660). For example, the orchestrator device (e.g., using processor 520, memory 530, storage component 540, input component 550, output component 560, communication interface 570, and/or the like) may forward the response, to the third module, as described above.

Process 600 may include additional implementations, such as any single implementation or any combination of implementations described below and/or in connection with one or more other processes described elsewhere herein.

In a first implementation, the first cloud platform and the second cloud platform are separated by a jurisdictional firewall.

In a second implementation, alone or in combination with the first implementation, at least one of the jurisdictional characteristic of the first jurisdiction or the jurisdictional characteristic of the second jurisdiction is an information privacy requirement.

In a third implementation, alone or in combination with one or more of the first and second implementations, the request includes a first portion of information for fulfillment of the request, and a second portion of the information, for fulfillment of the request, is not compliant with the jurisdictional characteristic of the second jurisdiction and is not included in the request, and the method further comprising: receiving, after forwarding the response, a token confirming receipt of the second portion of information within the second cloud platform; and forwarding, to the second module, the token to indicate that fulfillment of the request is to occur without the orchestrator device receiving the second portion of the information.

In a fourth implementation, alone or in combination with one or more of the first through third implementations, the first cloud platform is co-located in the first jurisdiction with a first interface to one or more systems in the first jurisdiction, and the second cloud platform is co-located in the second jurisdiction with a second interface to one or more systems in the second jurisdiction.

In a fifth implementation, alone or in combination with one or more of the first through fourth implementations, process 600 includes receiving, via an interface in the first jurisdiction, one or more commands relating to one or more development operations tools; and controlling the second cloud platform in the second jurisdiction based at least in part on receiving the one or more commands relating to the one or more development operations tools via the interface in the first jurisdiction.

In a sixth implementation, alone or in combination with one or more of the first through fifth implementations, process 600 includes monitoring, by the orchestrator device, one or more microservices of at least one of the first cloud platform or the second cloud platform.

Although FIG. 6 shows example blocks of process 600, in some implementations, process 600 may include additional blocks, fewer blocks, different blocks, or differently arranged blocks than those depicted in FIG. 6. Additionally, or alternatively, two or more of the blocks of process 600 may be performed in parallel.

Figure 7:
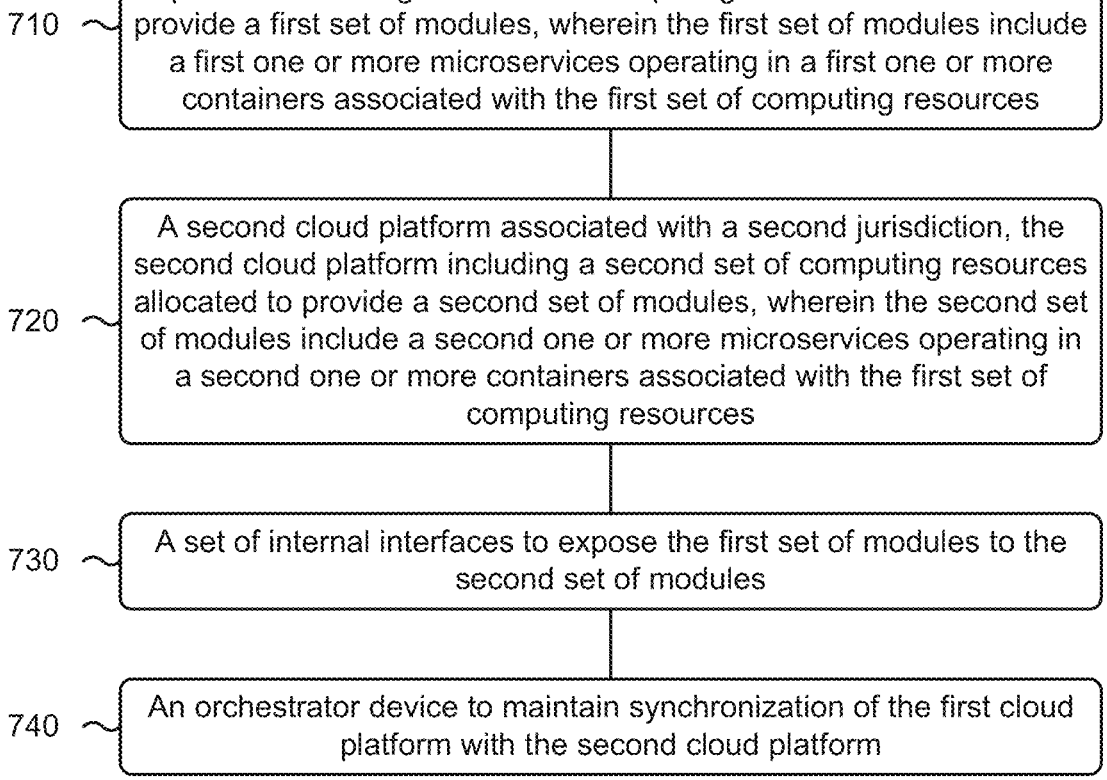
FIG. 7 is a system diagram relating to cross-jurisdictional microservice-based cloud platform deployment.

FIG. 7 is a system diagram 700 for cross-jurisdictional microservice-based cloud platform deployment. In some implementations, one or more process blocks of FIG. 7 may correspond to an inter-jurisdictional platform described herein.

As shown in FIG. 7, system diagram 700 may include a first cloud platform associated with a first jurisdiction, the first cloud platform including a first set of computing resources allocated to provide a first set of modules, wherein the first set of modules include a first one or more microservices operating in a first one or more containers associated with the first set of computing resources (block 710). For example, the inter-jurisdictional platform may include a first cloud platform associated with a first jurisdiction, as described above. In some implementations, the first set of modules include a first one or more microservices operating in a first one or more containers associated with the first set of computing resources.

As further shown in FIG. 7, system diagram 700 may include a second cloud platform associated with a second jurisdiction, the second cloud platform including a second set of computing resources allocated to provide a second set of modules, wherein the second set of modules include a second one or more microservices operating in a second one or more containers associated with the first set of computing resources (block 720). For example, the inter-jurisdictional platform may include a second cloud platform associated with a second jurisdiction, as described above. In some implementations, the second set of modules include a second one or more microservices operating in a second one or more containers associated with the first set of computing resources.

As further shown in FIG. 7, system diagram 700 may include a set of internal interfaces to expose the first set of modules to the second set of modules (block 730). For example, the inter-jurisdictional platform may include a set of internal interfaces to expose the first set of modules to the second set of modules, as described above.

As further shown in FIG. 7, system diagram 700 may include an orchestrator device to maintain synchronization of the first cloud platform with the second cloud platform (block 740). For example, the inter-jurisdictional platform may an orchestrator device to maintain synchronization of the first cloud platform with the second cloud platform, as described above.

System diagram 700 may include additional implementations, such as any single implementation or any combination of implementations described below and/or in connection with one or more other processes described elsewhere herein.

In a first implementation, the inter-jurisdictional platform includes a set of monitoring components deployed in at least one of the first cloud platform or the second cloud platform to is monitoring at least one of the first set of modules or the second set of modules.

In a second implementation, alone or in combination with the first implementation, the set of monitoring components are configured to monitor at least one of: a set of microservices, a set of requests, a set of events, a set of events, or a set of dependencies.

In a third implementation, alone or in combination with one or more of the first and second implementations, the inter-jurisdictional platform includes a first set of external interfaces exposed to first devices within the first jurisdiction and not exposed to second devices within the second jurisdiction; and a second set of external interfaces exposed to the second devices within the second jurisdiction and not exposed to the first devices within the first jurisdiction.

In a fourth implementation, alone or in combination with one or more of the first through third implementations, the inter-jurisdictional platform includes a communication module to provide a user interface to a client device for display, wherein the user interface includes end-to-end information (e.g., information regarding modules in at each end of an information path from receiving a request at a first cloud network to fulfilling the request in a second cloud network) associated with a status of the first cloud platform or a status of the second cloud platform.

In a fifth implementation, alone or in combination with one or more of the first through fourth implementations, the inter-jurisdictional platform includes a prediction module to predict a failure in a module of the first cloud platform or predict a failure in a module of the second cloud platform based at least in part on monitoring the first cloud platform or the second cloud platform.

In a sixth implementation, alone or in combination with one or more of the first through fifth implementations, the inter-jurisdictional platform includes a resolution module to automatically identify a resolution to a predicted failure and to implement the resolution in order to avoid the predicted failure.

In a seventh implementation, alone or in combination with one or more of the first through sixth implementations, the first cloud platform includes a first deployment pipeline associated with the first jurisdiction, and the second cloud platform includes a second deployment pipeline associated with the second jurisdiction.

In an eighth implementation, alone or in combination with one or more of the first through seventh implementations, the inter-jurisdictional platform includes an automated testing module to automatically test modules for compliance during deployment.

Although FIG. 7 shows example blocks of system diagram 700, in some implementations, system diagram 700 may include additional blocks, fewer blocks, different blocks, or differently arranged blocks than those depicted in FIG. 7.

Figure 8:
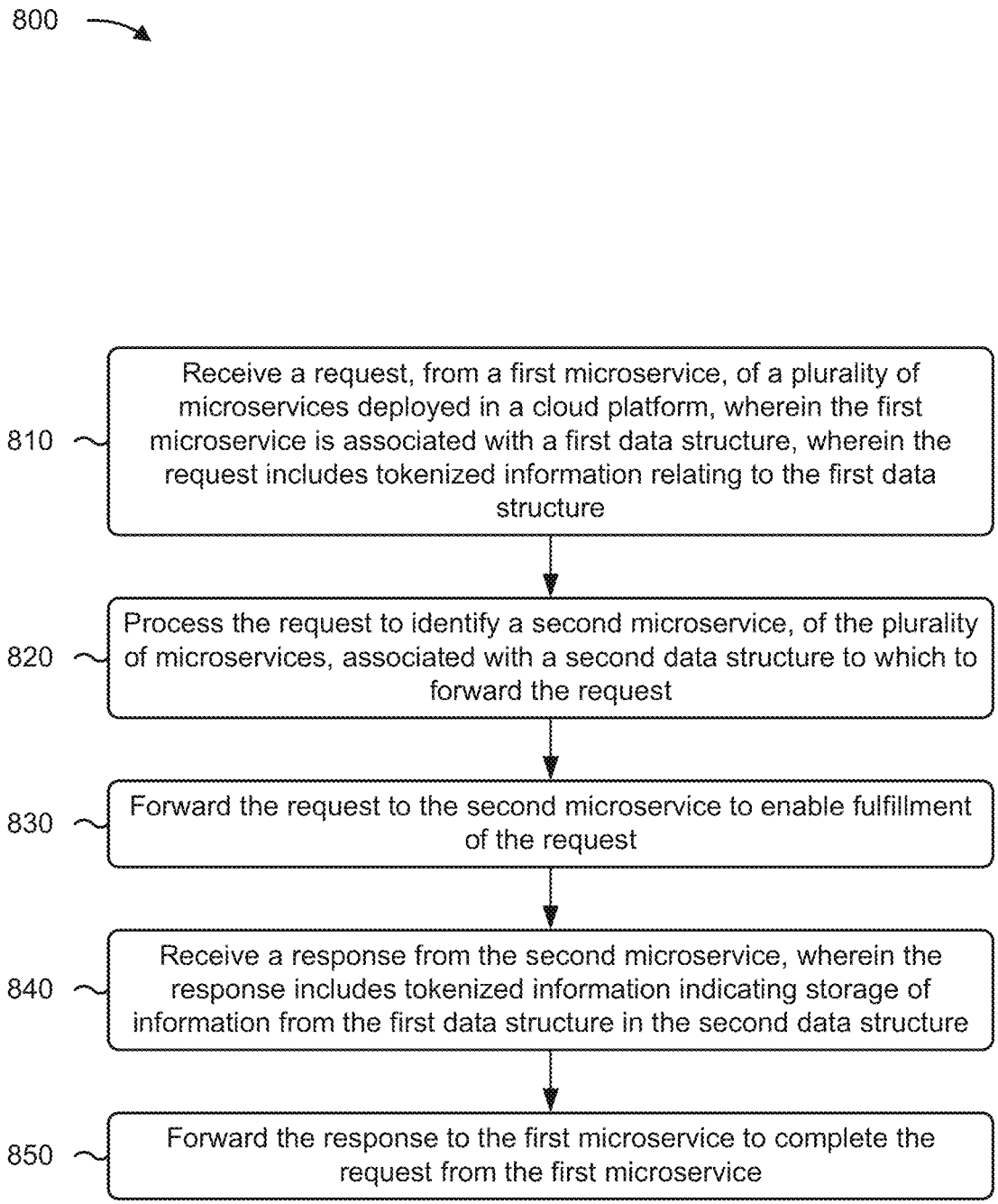
FIG. 8 is a flow chart of an example process relating to cross jurisdictional microservice-based cloud platform deployment.

FIG. 8 is a flow chart of an example process 800 for cross jurisdictional microservice-based cloud platform deployment. In some implementations, one or more process blocks of FIG. 8 may be performed by an orchestrator device (e.g., orchestrator device 440). In some implementations, one or more process blocks of FIG. 8 may be performed by another device or a group of devices separate from or including the orchestrator device, such as a client device (e.g., client device 450), and/or the like.

As shown in FIG. 8, process 800 may include receiving a request, from a first microservice, of a plurality of microservices deployed in a cloud platform, wherein the first microservice is associated with a first data structure, wherein the request includes tokenized information relating to the first data structure (block 810). For example, the orchestrator device (e.g., using processor 520, memory 530, storage component 540, input component 550, output component 560, communication interface 570, and/or the like) may receive a request, from a first microservice, of a plurality of microservices deployed in a cloud platform, as described above. In some implementations, the first microservice is associated with a first data structure. In some implementations, the request includes tokenized information relating to the first data structure.

As further shown in FIG. 8, process 800 may include processing the request to identify a second microservice, of the plurality of microservices, associated with a second data structure to which to forward the request (block 820). For example, the orchestrator device (e.g., using processor 520, memory 530, storage component 540, input component 550, output component 560, communication interface 570, and/or the like) may process the request to identify a second microservice, of the plurality of microservices, associated with a second data structure to which to forward the request, as described above.

As further shown in FIG. 8, process 800 may include forward the request to the second microservice to enable fulfillment of the request (block 830). For example, the orchestrator device (e.g., using processor 520, memory 530, storage component 540, input component 550, output component 560, communication interface 570, and/or the like) may forward the request to the second microservice to enable fulfillment of the request, as described above.

As further shown in FIG. 8, process 800 may include receiving a response from the second microservice, wherein the response includes tokenized information indicating storage of information from the first data structure in the second data structure (block 840). For example, the orchestrator device (e.g., using processor 520, memory 530, storage component 540, input component 550, output component 560, communication interface 570, and/or the like) may receive a response from the second microservice, as described above. In some implementations, the response includes tokenized information indicating storage of information from the first data structure in the second data structure.

As further shown in FIG. 8, process 800 may include forward the response to the first microservice to complete the request from the first microservice (block 850). For example, the orchestrator device (e.g., using processor 520, memory 530, storage component 540, input component 550, output component 560, communication interface 570, and/or the like) may forward the response to the first microservice to complete the request from the first microservice, as described above.

Process 800 may include additional implementations, such as any single implementation or any combination of implementations described below and/or in connection with one or more other processes described elsewhere herein.

In a first implementation, process 800 includes communicating with at least one third microservice as an intermediate validation step to fulfilling the request.

In a second implementation, alone or in combination with the first implementation, each microservice of the plurality of microservices is a containerized application.

In a third implementation, alone or in combination with one or more of the first and second implementations, the orchestrator device is an asynchronous communication interface.

Although FIG. 8 shows example blocks of process 800, in some implementations, process 800 may include additional blocks, fewer blocks, different blocks, or differently arranged blocks than those depicted in FIG. 8. Additionally, or alternatively, two or more of the blocks of process 800 may be performed in parallel.

The foregoing disclosure provides illustration and description, but is not intended to be exhaustive or to limit the implementations to the precise form disclosed. Modifications and variations may be made in light of the above disclosure or may be acquired from practice of the implementations.

It will be apparent that systems and/or methods described herein may be implemented in different forms of hardware, firmware, and/or a combination of hardware and software. The actual specialized control hardware or software code used to implement these systems and/or methods is not limiting of the implementations. Thus, the operation and behavior of the systems and/or methods are described herein without reference to specific software code—it being understood that software and hardware can be used to implement the systems and/or methods based on the description herein.

Even though particular combinations of features are recited in the claims and/or disclosed in the specification, these combinations are not intended to limit the disclosure of various implementations. In fact, many of these features may be combined in ways not specifically recited in the claims and/or disclosed in the specification. Although each dependent claim listed below may directly depend on only one claim, the disclosure of various implementations includes each dependent claim in combination with every other claim in the claim set.

No element, act, or instruction used herein should be construed as critical or essential unless explicitly described as such. Also, as used herein, the articles "a" and "an" are intended to include one or more items, and may be used interchangeably with "one or more." Further, as used herein, the article "the" is intended to include one or more items referenced in connection with the article "the" and may be used interchangeably with "the one or more." Furthermore, as used herein, the term "set" is intended to include one or more items (e.g., related items, unrelated items, a combination of related and unrelated items, etc.), and may be used interchangeably with "one or more." Where only one item is intended, the phrase "only one" or similar language is used. Also, as used herein, the terms "has," "have," "having," or the like are intended to be open-ended terms. Further, the phrase "based on" is intended to mean "based, at least in part, on" unless explicitly stated otherwise. Also, as used herein, the term "or" is intended to be inclusive when used in a series and may be used interchangeably with "and/or," unless explicitly stated otherwise (e.g., if used in combination with "either" or "only one of").

What is claimed is:

1. A method, comprising:
   receiving, by an orchestrator device in a first cloud platform in a first jurisdiction, a request from a first module deployed in a second cloud platform in a second jurisdiction,
      wherein the first jurisdiction and the second jurisdiction are associated with different jurisdictional characteristics related to restrictions of data transmission external to the first jurisdiction and the second jurisdiction,
      wherein information associated with fulfillment of the request includes at least a first portion that is compliant with a jurisdictional characteristic of the second jurisdiction, and a second portion that is not compliant with the jurisdictional characteristic of the second jurisdiction, and
      wherein the request, received by the orchestrator device, includes the first portion and does not include the second portion;
   processing, by the orchestrator device, the request in order to identify a second module deployed in the first cloud platform to which to forward the request;
   receiving, by the orchestrator device, a token confirming receipt of the second portion within the second cloud platform;
   forwarding, by the orchestrator device and to the second module, the token to indicate that the request is to be fulfilled without the orchestrator device receiving the second portion;

forwarding, by the orchestrator device, the request to the second module to enable fulfillment of the request;
receiving, by the orchestrator device, a response from the second module,
    wherein the response is compliant with a jurisdictional characteristic of the first jurisdiction;
identifying, by the orchestrator device and based on processing the response, a third module deployed in the second cloud platform to which to forward the response; and
forwarding, by the orchestrator device, the response, to the third module.

2. The method of claim 1, wherein the first cloud platform and the second cloud platform are separated by a jurisdictional firewall.

3. The method of claim 1, wherein at least one of the jurisdictional characteristic of the first jurisdiction or the jurisdictional characteristic of the second jurisdiction is an information privacy requirement.

4. The method of claim 1, wherein the first cloud platform is co-located in the first jurisdiction with a first interface to one or more systems in the first jurisdiction, and the second cloud platform is co-located in the second jurisdiction with a second interface to one or more systems in the second jurisdiction.

5. The method of claim 1, further comprising:
receiving, via an interface in the first jurisdiction, one or more commands relating to one or more development operations tools; and
controlling the second cloud platform in the second jurisdiction based at least in part on receiving the one or more commands relating to the one or more development operations tools via the interface in the first jurisdiction.

6. The method of claim 1, further comprising:
monitoring, by the orchestrator device, one or more microservices of at least one of the first cloud platform or the second cloud platform.

7. The method of claim 1, further comprising:
confirming receipt of the second portion within the second cloud platform; and
providing data indicating that the request is to be fulfilled without the orchestrator device receiving the second portion.

8. A device, comprising:
one or more processors to:
    receive a request from a first module deployed in a second cloud platform in a second jurisdiction,
        wherein the device is associated with a first cloud platform in a first jurisdiction,
        wherein the first jurisdiction and the second jurisdiction are associated with different jurisdictional characteristics related to restrictions of data transmission external to the first jurisdiction and the second jurisdiction,
        wherein information associated with fulfillment of the request includes at least a first portion that is compliant with a jurisdictional characteristic of the second jurisdiction, and a second portion that is not compliant with the jurisdictional characteristic of the second jurisdiction, and
        wherein the request, received by the device, includes the first portion and does not include the second portion;
    process the request in order to identify a second module deployed in the first cloud platform to which to forward the request;
    receive a token confirming receipt of the second portion within the second cloud platform;
    forward, to the second module, the token to indicate that the request is to be fulfilled without the device receiving the second portion;
    forward the request to the second module to enable fulfillment of the request;
    receive a response from the second module,
        wherein the response is compliant with a jurisdictional characteristic of the first jurisdiction;
    identify, based on processing the response, a third module deployed in the second cloud platform to which to forward the response; and
    forward the response to the third module.

9. The device of claim 8, wherein the first cloud platform and the second cloud platform are separated by a jurisdictional firewall.

10. The device of claim 8, wherein at least one of the jurisdictional characteristic of the first jurisdiction or the jurisdictional characteristic of the second jurisdiction is an information privacy requirement.

11. The device of claim 8, wherein the first cloud platform is co-located in the first jurisdiction with a first interface to one or more systems in the first jurisdiction, and the second cloud platform is co-located in the second jurisdiction with a second interface to one or more systems in the second jurisdiction.

12. The device of claim 8, wherein the one or more processors are further to:
receive, via an interface in the first jurisdiction, one or more commands relating to one or more development operations tools; and
control the second cloud platform in the second jurisdiction based at least in part on receiving the one or more commands relating to the one or more development operations tools via the interface in the first jurisdiction.

13. The device of claim 8, wherein the one or more processors are further to:
monitor one or more microservices of at least one of the first cloud platform or the second cloud platform.

14. The device of claim 8, wherein the one or more processors are further to:
confirm receipt of the second portion within the second cloud platform; and
provide data indicating that the request is to be fulfilled without the device receiving the second portion.

15. A non-transitory computer-readable medium storing instructions, the instructions comprising:
one or more instructions that, when executed by one or more processors of a device, cause the one or more processors to:
    receive a request from a first module deployed in a second cloud platform in a second jurisdiction,
        wherein the device is associated with a first cloud platform in a first jurisdiction,
        wherein the first jurisdiction and the second jurisdiction are associated with different jurisdictional characteristics related to restrictions of data transmission external to the first jurisdiction and the second jurisdiction,
        wherein information associated with fulfillment of the request includes at least a first portion that is compliant with a jurisdictional characteristic of the second jurisdiction, and a second portion that is not compliant with the jurisdictional characteristic of the second jurisdiction, and wherein the request, received by the device, includes the first portion and does not include the second portion;

process the request in order to identify a second module deployed in the first cloud platform to which to forward the request;

receive a token confirming receipt of the second portion within the second cloud platform;

forward, to the second module, the token to indicate that the request is to be fulfilled without the device receiving the second portion;

forward the request to the second module to enable fulfillment of the request;

receive a response from the second module,
wherein the response is compliant with a jurisdictional characteristic of the first jurisdiction;

identify, based on processing the response, a third module deployed in the second cloud platform to which to forward the response; and forward the response to the third module.

16. The device of claim 15, wherein the first cloud platform and the second cloud platform are separated by a jurisdictional firewall.

17. The device of claim 15, wherein at least one of the jurisdictional characteristic of the first jurisdiction or the jurisdictional characteristic of the second jurisdiction is an information privacy requirement.

18. The device of claim 15, wherein the first cloud platform is co-located in the first jurisdiction with a first interface to one or more systems in the first jurisdiction, and the second cloud platform is co-located in the second jurisdiction with a second interface to one or more systems in the second jurisdiction.

19. The device of claim 15, wherein the one or more instructions, when executed by the one or more processors, further cause the one or more processors to:
receive, via an interface in the first jurisdiction, one or more commands relating to one or more development operations tools; and
control the second cloud platform in the second jurisdiction based at least in part on receiving the one or more commands relating to the one or more development operations tools via the interface in the first jurisdiction.

20. The device of claim 15, wherein the one or more instructions, when executed by the one or more processors, further cause the one or more processors to:
monitor one or more microservices of at least one of the first cloud platform or the second cloud platform.

* * * * *